Jan. 7, 1958 M. J. UPDEGRAFF 2,818,768
PHOTOGRAPHIC EQUIPMENT
Filed March 10, 1953 3 Sheets-Sheet 2

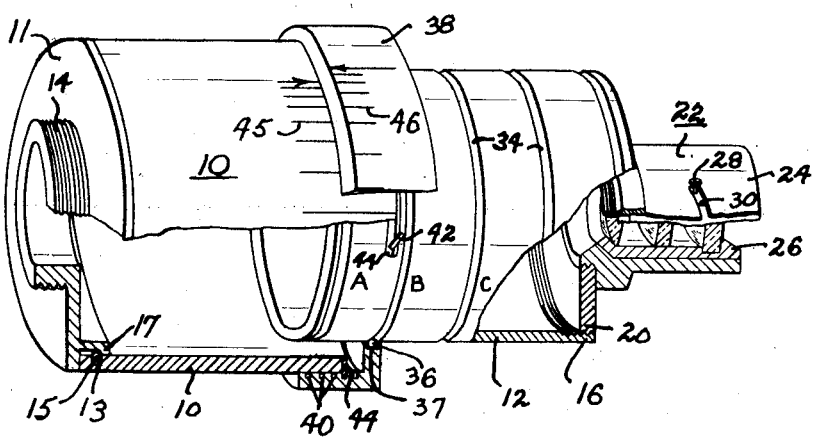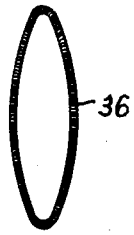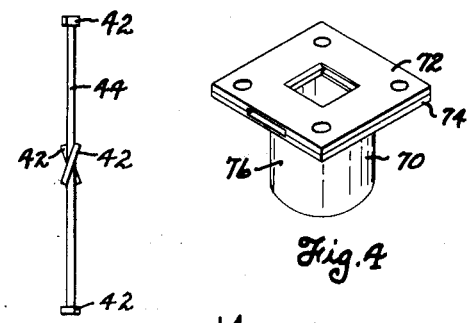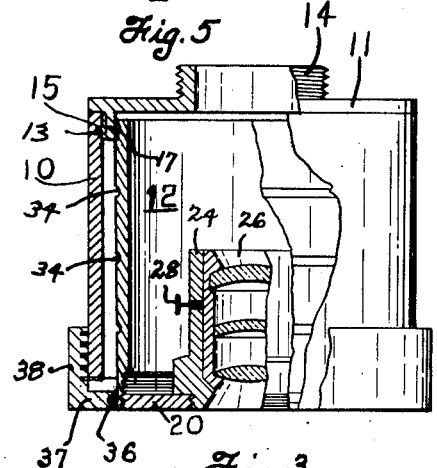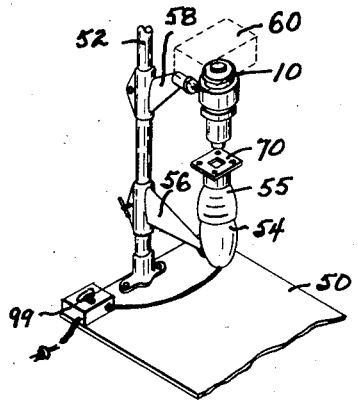

INVENTOR.
MERVIN J. UPDEGRAFF.
BY
His Attorney

Jan. 7, 1958    M. J. UPDEGRAFF    2,818,768
PHOTOGRAPHIC EQUIPMENT
Filed March 10, 1953    3 Sheets-Sheet 3

INVENTOR.
MERVIN J. UPDEGRAFF
BY
HIS ATTORNEY

United States Patent Office 2,818,768
Patented Jan. 7, 1958

2,818,768

PHOTOGRAPHIC EQUIPMENT

Mervin J. Updegraff, Dayton, Ohio.

Application March 10, 1953, Serial No. 341,393

7 Claims. (Cl. 88—24)

This invention relates to photographic apparatus and more particularly to improved apparatus for use with miniature cameras.

It is an object of this invention to provide an improvement over the apparatus shown in applicant's earlier Patent No. 2,574,072.

Another object of this invention is to provide a lens supporting attachment having improved means for focusing.

More particularly, it is an object of this invention to provide an arrangement in which the apparatus can be easily and quickly focused and in which it is possible to remove, and to accurately return the parts to a given relative relationship for a given focus.

A further object of this invention is to provide an improved lens supporting attachment which may be made at low cost and which provides practically unlimited focusing adjustment, whereby it is possible to obtain exactly the desired composition or magnification of the image.

Another object is to provide an improved device for holding the film optically flat in the enlarging operation.

Still another object is to provide an improved arrangement for controlling the color temperature of the light used in various types of color photography.

Other objects and advantages reside in the construction of parts, the combination thereof and the mode of operation, as will become more apparent from the following description.

In the drawings:

Figure 1 is a pictorial view, with parts broken away, showing a preferred form of lens supporting attachment;

Figure 2 is a pictorial view showing one application of the preferred embodiment of this invention;

Figure 3 is an elevational view, with parts broken away, showing the lens supporting attachment;

Figure 4 is a perspective view of a composing and focusing viewer attachment for use with the lens supporting attachment;

Figure 5 is a side elevational view showing a ring which is provided with interrupted thread segments for use in the lens supporting attachment;

Figure 6 is a pictorial view of the detent spring;

Figure 11 is a schematic view showing means for accurately controlling the color temperature and intensity of the light used in photographing and in making prints of pictures and the like;

Figure 11:
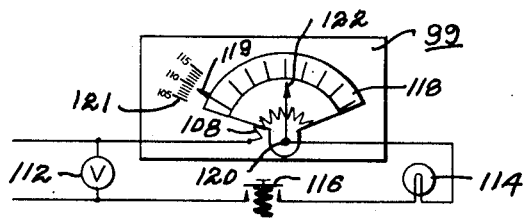

The lens supporting attachment illustrated in the drawings has been designed to increase the utility of standard cameras and particularly miniature cameras and to make it possible for camera users to enjoy the increased utility without the necessity of spending additional money.

For purposes of illustration, a special lens supporting tube is shown, designed for use with a 2" lens which is standard on nearly all miniature cameras, although it is obvious that the invention is equally applicable to other lens sizes and other types of cameras.

The lens of the average miniature camera has far more utility than most users realize, in that it is not only capable of relatively short exposure in light of low intensity, but is also highly corrected, possessing unusual depth of field at relative apertures and capable of sharpness of focus almost beyond comprehension, with resolving power to a circle of confusion of approximately $1/200$ inch in less expensive lenses and to perhaps $1/2000$ inch in higher grade lenses.

The lens attachment described herein is designed to take maximum advantage of the capabilities of such lenses, so as to greatly increase the utility of the miniature camera. Thus, the attachment makes it possible to use this camera to do close-up table top photography, macrophotography and photomicrography, to copy all manner of pictures, drawings, maps, documents, to take pictures of material textures, flowers, flies, insects and myriad other subjects from nature, either in black and white or in colors.

Referring now to Figures 1 and 3 of the drawings, wherein is shown a preferred form of the lens attachment, reference numerals 10 and 12 designate outer and inner telescopic tubes wherein the outer tube 10 is provided with a removable end piece 11 having a threaded portion 14 which is adapted to fit the threaded lens supporting aperture of a standard camera. The end piece 11 is held in place relative to the tube 10 by means of a garter type of detent spring 13 whereby it is possible to quickly assemble and disassemble the end piece 11 relative to the tube 10.

Figure 7:
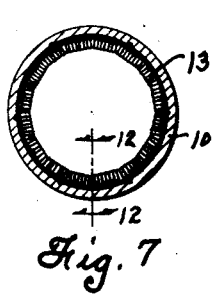
Figure 7 is a vertical sectional view showing the mounting arrangement of the detent spring.
Figure 12:
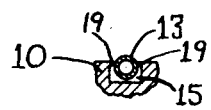
Figure 12 is a fragmentary sectional view taken substantially on the line 12—12 of Figure 7.

As best shown in Figures 1, 3, 7 and 12, the spring 13 is mounted within a groove 15 formed in the outer tube 10. The spring 13 is shown in Figure 7 in a sectional view taken at the edge of the groove showing the spring 13 in its location in the groove 15. Figure 12 shows the groove 15 and the manner in which the spring is retained in the groove 15. The groove 15 is partially closed at several points as shown by projections 19 to retain the spring 13 in the groove. The spring 13 is recessed in the groove 15 with only a portion of the spring 13 extending out of the groove 15. The end cap 11 has a flange 17 which snaps through the spring 13, so as to removably hold the cap 11 in place on the tube 10, as shown in Figure 1.

The inner tube 12 is slidably supported within the outer tube 10, as illustrated. The inner tube 12 is provided with an internal threaded portion 16 which is adapted to cooperate with complementary threads provided on a lens supporting plate-like ring 20. As shown in Figure 1 of the drawings, the ring 20 is also provided with internal threads which cooperate with complementary threads on the standard lens assembly or holder 22.

For purposes of illustration, a simplified form of lens holder is shown, which comprises an outer member 24 and a slidable inner lens mounting member 26 which telescopes within the member 24. The lens assembly 22 is intended to represent a conventional lens assembly of the type which comes as standard equipment on many cameras. In order to simplify this disclosure, the details of the lens assembly have not been shown. Thus, the lens assembly of a Leica camera, for example, includes a larger number of parts including means for adjusting the lens aperture as well as means for adjusting the focus.

Reference numeral 28 designates means for adjusting the position of the member 26 relative to the member 24. Thus, by moving the pin 28 within the angularly arranged slot 30, the focus of the lens assembly may be adjusted a small amount. The focusing made possible by moving the pin 28 within the slot 30 merely represents the standard focusing adjustment of the miniature camera lens and it is obvious that such adjustment of the focus is not enough to enable the average camera to be used for taking pictures of subjects within the close-up field or less than the usual three feet limitation of focus.

In order to provide for controlled movement of the inner tube 12 within the outer tube 10, the inner tube 12 is provided with a series of circumferentially extending grooves 34 which serve as detents which cooperate with the coil spring 36 carried by the adjusting sleeve or focusing nut 38 which is threaded onto the one end of the outer tube 10 in a manner to be explained more fully hereinafter. The coil spring 36 is held within an internal groove 37 provided in the nut 38 as shown. The width of the groove 37 is slightly narrower at the open edge, so as to prevent the coil spring 36 from dropping out of the groove when the inner tube 12 is removed from the outer tube 10.

The nut 38 is provided with internal threads or channels 40 which cooperate with offset projections or interrupted screw thread portions 42 provided on the ring 44. The ring 44 is adapted to be welded or otherwise fastened to the outer end of the outer tube 10, as explained more fully hereinafter.

Thus, by causing relative rotation between the outer tube 10 and the nut 38, it is possible to produce telescopic movement of the inner tube 12 relative to the outer tube 10. The pitch of the threads 40 is purposely designed such that the outer tube 10 will be moved a distance substantially equal to the distance between adjacent grooves 34 in one or less than one turn of the nut 38 relative to the outer tube 10. Turning of the nut 38 does not cause any endwise movement of the inner tube 12 relative to the nut 38, but it does cause relative movement between the outer tube 10 and the nut 38.

By virtue of the above described arrangement, it will be noted that major rough adjustments may be made quickly by merely pulling in or out on the inner tube 12, so as to shift the spring 36 from one of the grooves 34 to another, and the finer adjstments may be obtained by rotating the nut 38 relative to the outer tube 10. One big advantage of this arrangement is that after one has made preliminary focusing tests so as to obtain the desired adjustment, it is possible to remove the inner tube 12 from the outer tube 10 and subsequently return the inner tube 12 to its original position without the need for again adjusting the focus.

The ring 44 is in the form of a stamped sheet metal ring which is secured to the end of the outer tube 10. For purposes of illustration the ring 44 has been shown provided with four spaced projections 42, whereas in actual practice it would be possible to use some other number of projections or to provide the outer tube 10 with projecting pins which would cooperate with the channels or threads 40 provided in the nut 38. One of several advantages of using the ring 44 is that the outer surface of the tube 10 proper does not need to be threaded or otherwise marred, thereby leaving the surface available for placing scales or other indicia thereon for use in focusing. Another advantage is that the thickness of the stock from which the tube 10 is cut need not be as great as if it were necessary to form threads directly on the tube itself. The ring 44 may be secured to the tube in any conventional manner such as by brazing, soldering, riveting, or the like.

It is desirable to be able to focus the equipment for a given job and to thereafter remove the inner tube 12 from within the outer tube 10 before actually making the final exposure and to thereafter return the inner tube to its original position relative to the outer tube 10 without the necessity for refocusing. This may be done very conveniently with the apparatus disclosed herein, as the final focusing operation is accomplished by rotating the nut 38 relative to the outer tube 10, and once the equipment is properly focused, the inner tube 12 may be readily removed and replaced without disturbing the adjustment of the nut 38. In fact, the construction described herein is such that it is possible to accurately reset all of the parts to a given setting for a given operation even after the setting of the adjusting nut 38 has been disturbed. In order to facilitate resetting the apparatus to a given focal adjustment, the adjusting nut 38 and the outer tube 10 have been provided with scales 45 and 46 as shown. The scale 45, which is located on the outer surface of the tube 10, includes a first arrow which is designed to cooperate with the individual lines on the scale 46 located on the nut 38 when the apparatus is used for enlarging, for example. Likewise, the scale 46 on the nut 38 includes a second arrow which cooperates with the individual lines on the scale 45 when the apparatus is used for reducing. The scales may also be employed in indicating the proper adjustment of the telescopic members when various lenses each having a different focal length are used.

The inner tube 12 is also provided with suitable indicia, such as A, B and C, for the various grooves 34, so that the user can more readily note a particular setting of the inner tube relative to the outer tube for a given type of operation. The indicia on the inner tube 12 may, for example, correspond to various enlargement ratios, such as 1 to 1, 1 to 1½, 1 to 2, et cetera. By providing these scales, the apparatus may be used for a number of different types of operations, and when it is desired to repeat a certain type of operation, it is a simple matter to return the parts to a given setting merely by noting the relative positions of the scales for that type of operation.

In Figure 2 of the drawings, a convenient arrangement is shown for converting a standard camera into one for use in special types of photography. Thus, reference numeral 50 designates a table to which there is attached a vertical fixture supporting post 52. Reference numeral 54 designates a light carried by a bracket 56 which is adjustably mounted on the post 52. Reference numeral 58 designates a second adjustable bracket which is adapted to support the outer tube 10 of the lens supporting attachment in any desired position relative to the table 50. The bracket 58 allows vertical adjustment as well as tilting of the tube 10 relative to the vertical axis of the post 52. Reference numeral 60 designates a conventional camera in which the lens has been transferred from its usual mounting to the lower end of the tube 10 and its associated parts have replaced the lens in the camera. The camera lens is attached at the center of inner tube 12. The above described arrangement is also suitable for use in making enlargements. The light or lamp 54 is capable of swinging around and above an open camera or other device for use in enlarging. In the particular setting of the parts, as shown in Figure 2, the apparatus is suitable for use in specialized photography and for use in making enlarged transparencies from 8 or 16 mm. movie film.

In Figure 4 of the drawings, a perspective view is shown of a composing and focusing viewer 70 which may serve the purpose of an image viewer used while making enlargements and transparencies. The viewer 70 is adapted to replace end piece 11 to fit into the end of the outer tube 10. The viewer 70 comprises a pair of conventional separable plates 72 and 74 between which a negative movie film or ground glass may be supported in accordance with practice which is now well known. The plate 74 is attached to a cylindrical member 76 which is adapted to be slidable onto the upper end of the tube 10 or on the end piece 55 of the lamp unit 54, as shown in Figure 2 of the drawings.

In referring to Figure 2, it will be noted that the outer diameter of the tube 10 is the same as the outer diameter of the end portion 55 of the lamp unit 54, whereby it is possible to interchangeably support the attachment 70 either on the upper end of the tube 10 or the outer end 55 of the lamp unit 54 merely by sliding the attachment in place on one or the other.

The apparatus disclosed herein is particularly adaptable for use in specialized photography in that it makes it possible to support a film or a series of films adjacent the lamp unit and to project the image or images onto a negative mounted in a conventional camera placed adjacent the viewer 70. The viewer 70 may also be used for supporting a film adjacent the upper end of the tube 10 when it is desired to make enlargements.

Figure 8:
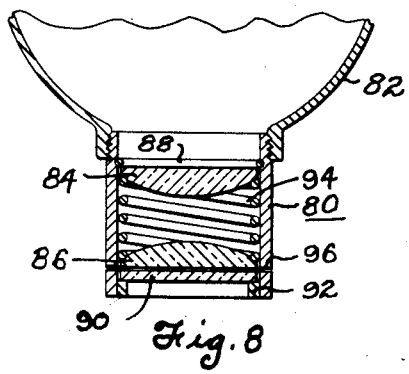
Figure 8 is a vertical sectional view taken substantially on line 8—8 of Figure 10 showing a modified form of film holder.
Figure 9:
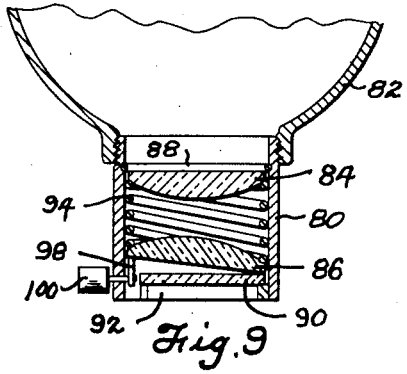
Figure 9 is a vertical sectional view taken on line 9—9 of Figure 10.
Figure 10:
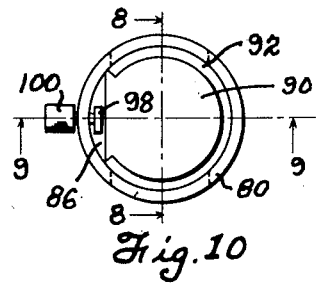
Figure 10 is a bottom view of the film holder shown in Figures 8 and 9.

In Figures 8 through 10 of the drawings, a modified form is shown of a multiple purpose attachment 80, somewhat similar to the attachment 70, and one which may be used either as an image viewer or as a film holder to be used while making enlargements, transparencies, or for other specialized photography. For purposes of illustration, the attachment 80 is disclosed as screwed directly to the end piece 82 and comprises a pair of condensing lenses 84 and 86 which are arranged as shown. The lens 84 is prevented from moving upwardly by the retainer ring 88, whereas the lens 86 is limited in its downward movement by a fixed glass plate 90 which is held in place by the retainer ring 92 secured within the lower end of the attachment 80. A coil spring 94 is mounted between the two condensing lenses and biases them away from one another.

The films or the like which are to be mounted in this attachment are introduced into the space between the glass plate 90 and the lens 86 through a slot 96. Prior to introducing any film into the slot 96, the condensing lens 86 is lifted, as shown in Figure 9, by means of a cam 98 which is adapted to be operated by turning the knob 100. By lifting the condensing lens 86, as shown in Figure 9, it is easy to insert the film between the lens 86 and the glass plate 90. Upon further turning of the knob 100, the condensing lens 86 is biased downwardly by the spring 94, so as to firmly position the transparency and to retain the transparency optically flat.

Figure 13:
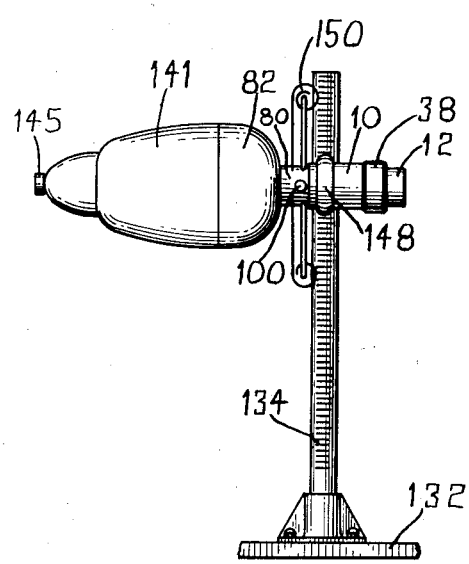
Figure 13 is a front view of a preferred modification of this invention showing one use of the invention.

Figures 13 through 16 disclose various arrangements and positions of the elements of the preferred modification showing possible applications of the preferred modification of the invention. A table 132 retains a supporting post 134 in a vertical position. The supporting post 134 is provided with a plurality of teeth 136 for positive adjustment of the height of a clamp 138 upon the post 134. A bracket 140 is formed integrally with the clamp 138. A rack 142 is adjustably retained by a clamp 146 upon the bracket 140. A lamp housing 141 is rotatably attached at point 143 to one end of the rack 142. The rack 142 is provided with teeth 144, which are adapted to act as positioning and locking means of the rack 142 upon the bracket 140. The clamp 146 is rotatably connected to the bracket 140. Due to the fact that the rack 142 is adjustably retained by the clamp 146, means are provided by which the distance of the lamp housing 141 from the bracket 140 may be adjusted. Also, by means of the clamp 146, the rack 142 may also be angularly adjusted upon the bracket 140, thus providing means for angular adjustment of the lamp housing 141 with respect to the bracket 140. The lamp housing 141 is rotatably mounted upon the rack 142. A clamping ring 148 at the end of the bracket 140 is adapted to adjustably and rotatably retain various elements of the invention. As disclosed in Figure 13, the preferred modification may be used as a projector. A film strip holder 150 is adapted to be mounted and attached upon the multiple purpose attachment 80. The film strip holder consists of two substantially U-shaped portions of wire. The ends of the wire are bent slightly so as to be inserted through radial orifices formed in the wall surface of the multiple purpose attachment 80. In the application as shown in Figure 13, the lens supporting attachment comprising outer tube 10 and inner tube 12 is attached to the multiple purpose attachment 80 and retained by the clamping ring 148 in substantially a horizontal position. The lens assembly 22 of the camera is thereby employed in the projection of a picture of the film strip upon a flat surface.

Figure 14:
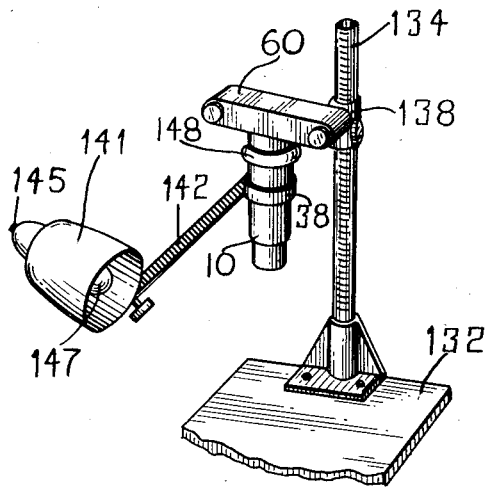
Figure 14 is a perspective view of the preferred modification of the invention with the parts assembled in another manner disclosing another function of the invention.

Figure 14 discloses the use of invention as it is employed in the taking of pictures with a conventional camera 60. The lens attachment having tubular portions 10 and 12 is mounted upon the bracket 140 and retained by the clamping ring 148. The camera 60 is threadedly attached to the lens attachment by means of the threaded portion 14. The lamp housing 141, with the end cover 82 removed, is used as a light source. A switch 145 located at the small end of the lamp housing 141 is adapted to control a light source 147 located with the lamp housing 141. The rack 142 is positioned at the proper angle so that the lamp housing may be positioned properly to effectively light the subject of the picture taken by the camera 60.

Figure 15:
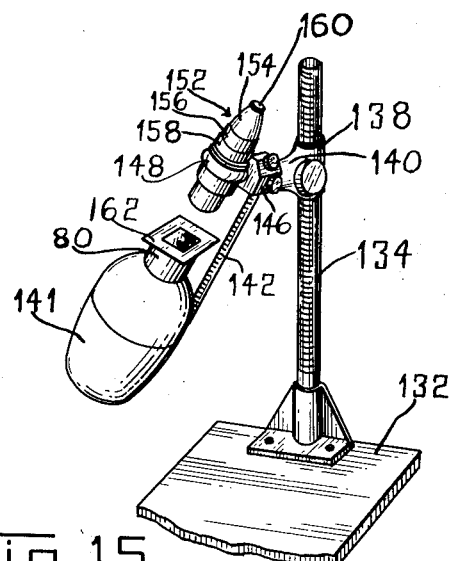
Figure 15 is another perspective view of the preferred modification showing still another assembly of the parts and another function of the invention.

Figure 15 discloses the use of the invention as a simplified optical bench arrangement. A viewer attachment 152 is retained by the clamping ring 148 upon the bracket 140. The viewer attachment 152 comprises a cup-shaped body 154. The body 154 is composed of two sections, 156 and 158. The section 158, having the larger diameter, has a support ring for a circular piece of ground glass. The ground glass is retained upon the support ring by the threaded connection of the inner section 156, the end of the inner section firmly holding the glass upon the support ring. A focusing eye piece 160 with lens is threadedly and adjustably mounted in the small end of the inner section 156. When the viewer 152 is mounted over the end of the outer tube 10, the ground glass surface is located precisely the distance from the camera lens equal to the focal plane of the camera. Thereby, it is possible to take a picture of a picture slide 162, or a portion of a picture slide 162, by first making the proper adjustments by means of the viewer attachment 152 as shown in Figure 15. The picture slide 162 is set upon the end of the multiple purpose attachment 80, as shown, or the film may be removed and held within the multiple purpose attachment 80 as previously described. The lamp housing 141 is adjustably positioned by means of the rack 142 upon the bracket 140. The picture slide 162 may thereby be positioned at the proper distance from the lens in the holder 22. The viewer may then be replaced by the camera 60 for the photographing of the picture slide 162 or a portion of the picture slide 162. The viewer 152 is inserted in the end of the tubular portion 10 by removal of the end piece 11. When the camera replaces the viewer 152, the end piece 11 is replaced and the camera attached to threaded portion 14.

Figure 16:
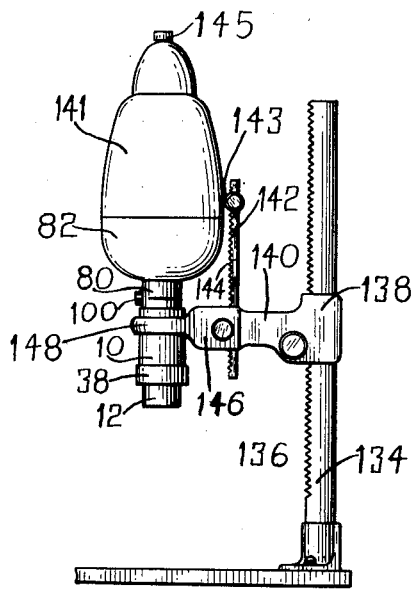
Figure 16 is a side view of the preferred modification disclosing another assembly arrangement of the parts and another function of the invention.

Figure 16 discloses the use of the invention as an enlarger. The parts of the invention are assembled in a manner very similar to that in Figure 13, except that the position of the lamp housing and of the lens supporting attachment is shown positioned substantially vertical. However, the lamp housing and the lens attachment may be used in any angular position during any application of the invention. A means of distortion control is hereby available. The lamp housing 141 with the lens holding attachment may be used at any angle, whether the invention is used as a viewer, as a projector, as an enlarger, or as a retainer for and holder for a camera. It may be readily understood that there are a great number of uses of the invention. This invention may be applied to serve almost any function that may be desired by an owner of a conventional miniature type of camera.

It is recognized that color photographic processing is more critical than black and white. In addition to exposure and development, there is the factor of color temperature of light that influences all colors in a color transparency or color print. The light usually considered normal for color photography is sunlight during the four hours in midday. An incandescent lamp burning in noon daylight will appear to be very yellow by contrast, due to its lower color temperature. Light varies greatly in this quality for many reasons. To accommodate this variance between daylight and artificial light, two types of film are used, each "balanced" for its specific use. Additional "color correction" is available by other means, the use of filters singly or in combination, by light control, exposure of film, et cetera. A means to achieve light control often consists of an incandescent lamp in electrical hookup with a transformer and rheostat. The transformer increases the line voltage; for example, the transformer may increase the line voltage from 110 volts to 150 volts. The rheostat is used to regulate the actual amount of current flowing through the bulb or lamp. As the rheostat is advanced, more current flows into the lamp, causing the filament to glow brighter and increasing the color temperature of the light. To achieve this variable means in the above manner obviously requires a transformer, a rheostat, and usually a voltmeter in combination with the lamp. This equipment is fairly expensive for the purpose it serves and thus limits its availability to persons wishing to do this work. It is also limited in capacity to the specific number of lamps it will operate—often 1, 2, 3 or 4 lamps of varying ratings.

My device, generally designated by the reference numeral 99, utilizes a new approach to controllable color temperature. I utilize a standard 110 volt circuit with a rheostat element 108, a voltmeter 112, an incandescent lamp 114 of, for example, 75 volts, and a push button switch 116, as shown in Figure 11. The lamp or bulb 114 would be mounted in a housing such as the housing 54 or 82 described hereinabove. This improved arrangement eliminates the need for an expensive and cumbersome transformer. For all operations, except actual exposure of color film or print material, the bulb is operated at its normal brilliance of 75 volts. Compensation must be made, however, for fluctuations in line voltage. To achieve a given color temperature for the photographic function at hand at the line voltage supplied, the actual line voltage is read on the voltmeter 112. A movable index or scale element 118, which is pivotally mounted at 120 and which is provided with a pointer 119, is then adjusted to the correct line voltage as indicated on the scale 121. The rheostat contactor arm 122 is then rotated to the desired Kelvin rating given on the scale 118, whereby the bulb 114 will operate at the exact voltage to produce the correct color temperature. Light of the desired color temperature is now available by pressing the switch, holding it for the desired time, and releasing it to turn the light off. Thus, the lamp burns at the life-shortening higher color temperatures only for the exact seconds of exposure time desired.

This color temperature arrangement is likewise advantageous for black and white photography, in that it provides a fast, simple and highly accurate exposure means in addition to the usual, generally inconvenient, method of changing lens f stops, as in the enlarging procedure where they are frequently inverted and hard to read, or where such adjustments may disturb focus or alignment.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a device for making color transparencies from movie film and the like, the combination including a base, a support mounted on said base, a light unit having a tubular end portion, said light unit being adjustably carried by said support, a film holder having a cylindrical portion slidable over the tubular end portion of said light unit so as to be removably secured to said light unit and rotatable relative thereto, a lens holder, and means for adjustably supporting said lens holder on said support, said supporting means including means for universally tilting said lens holder relative to said support whereby image distortion may be corrected, said lens holder comprising an outer tube provided with a threaded projection at one end thereof adapted to fit the threaded lens supporting aperture of a standard camera, the outer diameter of said tube being such that the tube may receive the cylindrical portion of said film holder for interchangeably supporting said film holder, a sleeve having an internal groove, the other end of said outer tube threadedly engaging said sleeve, an annular coil spring recessed in said internal groove, said sleeve being adjustable on said outer tube whereby the distance between the threaded projection at one end of the tube and the coil spring recessed in the sleeve at the other end of the tube is variable, and a lens supporting inner tube adapted to telescopically slide within said outer tube, said inner tube having a plurality of equally spaced annular grooves in the periphery thereof, said annular coil spring providing a releasable detent for engaging said spaced annular grooves whereby said inner and outer tubes may be telescoped together to a predetermined position.

2. In a device for making color transparencies from movie film and the like, the combination according to claim 1 wherein the sleeve threadedly engaging said outer tube is adjustable upon said outer tube throughout a distance substantially equal to the spacing between the annular grooves in the periphery of said inner tube.

3. A lens extension tube assembly adapted for attachment to the lens supporting aperture of a standard camera or the like, said assembly comprising, in combination, a first tube provided with threaded means for engaging the lens supporting aperture of a standard camera, a second tube adapted to slide telescopically within said first tube and provided with means for supporting a lens, and means for adjusting the distance from said threaded means to said lens supporting means including first means for making a fine adjustment and second means for making a coarse adjustment of said distance, said first means including an outer sleeve threadedly engaging said first tube at the end thereof opposite said threaded means, said sleeve having an internal annular groove, said second means including an annular coil spring seated within said annular groove, said second tube having a plurality of equally spaced annular grooves in the periphery thereof adapted to receive said coil spring, said coil spring providing an expansible detent for engaging said spaced annular grooves whereby the distance from said coil spring to said lens supporting means may be coarsely varied, said adjustable sleeve providing the means whereby the distance from said threaded portion to said coil spring may be finely varied.

4. A lens extension assembly according to claim 3 wherein the range of adjustment of said sleeve upon said first member is equal substantially to the spacing between adjacent annular grooves in the periphery of said second member.

5. A lens extension assembly according to claim 3 wherein the adjustment of the sleeve upon said first tube is indicated by a single indicium in the periphery of one of said elements cooperating with a plurality of radially spaced indicia in the periphery of the other of said elements.

6. A lens extension assembly comprising, in combination, an outer tubular member provided at one end thereof with a threaded projection adapted to engage the lens receiving aperture of a camera or the like, an internally threaded sleeve, the other end of said outer tubular member having an externally threaded portion adapted to receive said sleeve whereby said sleeve is adjustable upon said outer tubular member, said sleeve having an internal annular groove, an annular coil spring seated within said annular groove, the distance between said annular coil spring and the threaded projection at the other end of said outer tubular member being adjustable by rotating said sleeve relative to said outer tubular member, and an inner tubular member adapted to slide telescopically within said outer tubular member, said inner tubular member having means for supporting a lens at one end thereof and a plurality of equally spaced annular grooves in the periphery thereof, said coil spring providing an expansible annular detent for engaging said annular grooves whereby said inner tubular member is adjustable within said outer tubular member such that the distance from said annular coil spring to said lens supporting means is variable, the arrangement of parts being such that the variation in the distance from said threaded projection to said coil spring is equal substantially to the spacing between adjacent annular grooves in the periphery of said inner tubular member.

7. A film holder for removable attachment to a light unit, said film holder comprising a tubular housing, a pair of condensing lenses mounted within said housing, spring means between said condensing lenses, a film supporting plate adjacent one of said condensing lenses whereby a film may be held between said plate and said last named condensing lens, and means for moving said last named condensing lens away from said plate in opposition to said spring means to facilitate removal and insertion of films into said film holder, said means comprising a cam for engaging said last named condensing lens within said housing, a cam operating knob external to said housing, and a shaft penetrating the wall of said housing connecting said cam and said cam operating knob.

References Cited in the file of this patent

UNITED STATES PATENTS

| | | |
|---|---|---|
| 1,216,696 | John | Feb. 20, 1917 |
| 1,417,326 | Jacobson | May 23, 1922 |
| 1,848,253 | Howell | Mar. 8, 1932 |
| 1,930,431 | Barnack | Oct. 10, 1933 |
| 2,061,192 | Gaty | Nov. 17, 1936 |
| 2,138,445 | Dautzenberg | Nov. 29, 1938 |
| 2,238,762 | Whitaker | Apr. 15, 1941 |
| 2,266,908 | Rogers | Dec. 23, 1941 |
| 2,375,213 | Chilton | May 8, 1945 |
| 2,381,228 | Schmidt | Aug. 7, 1945 |
| 2,388,842 | Hanson | Nov. 13, 1945 |
| 2,454,422 | Atkinson | Nov. 23, 1948 |
| 2,574,072 | Updegraff | Nov. 6, 1951 |
| 2,624,252 | Judd | Jan. 6, 1953 |